United States Patent Office 3,328,294
Patented June 27, 1967

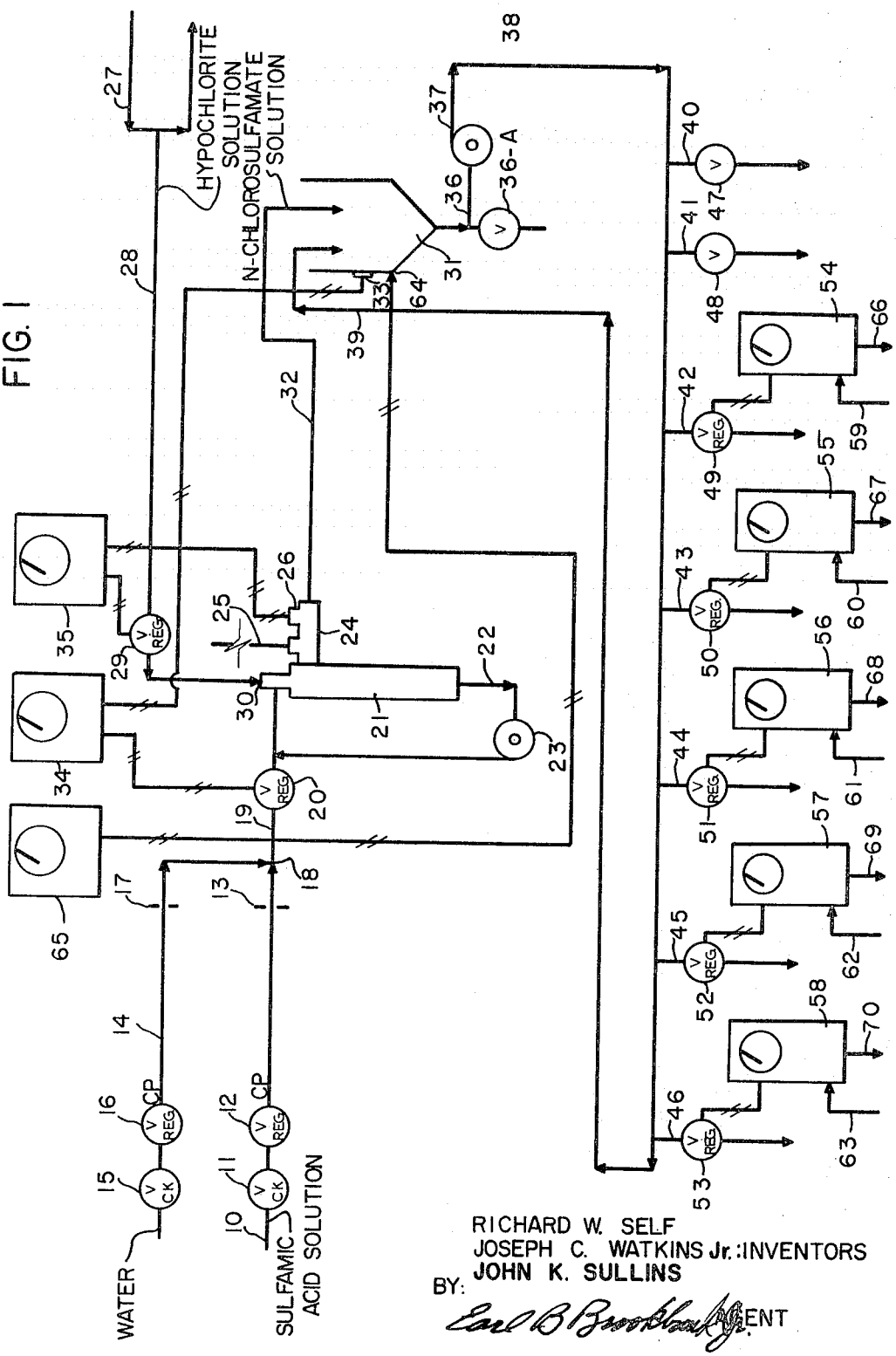

3,328,294
PROCESS FOR CONTROL OF MICRO-ORGANISMS IN PROCESS STREAMS
Richard W. Self, Blountville, and Joseph C. Watkins, Jr., and John K. Sullins, Kingsport, Tenn., assignors to The Mead Corporation, Dayton, Ohio, a corporation of Ohio
Filed Sept. 19, 1966, Ser. No. 584,310
20 Claims. (Cl. 210—62)

This is a continuation-in-part of co-pending application, Ser. No. 362,238, filed Apr. 24, 1964, now abandoned.

This invention relates to a method and apparatus for controlling growth of micro-organisms and more particularly the control of the growth of such micro-organisms in process water streams.

Industry is continuously faced with the problem of preventing or controlling the growth of molds, slimes and bacteria in a variety of operations. As examples may be cited the need for elimination of slime-causing bacteria in paper machine stock and white water systems, the treatment of industrial and sanitary wastes, treatment of recirculating water streams in cooling towers and the like, prevention of bacterial growth in starch and/or protein adhesive systems, coating compositions and industrial and municipal water supply systems.

Heretofore, a variety of chemicals have been used for these various purposes, such as elemental chlorine, hypochlorites, chloramine, chlorinated phenols and other phenolic compounds, quaternary ammonium compounds, organic mercurials, organo-tin compounds, and the like. The selection of a particular treating agent for control of micro-organisms is usually dictated by the particular process water stream to be treated, as well as the kind of micro-organism encountered. Treatment of water subsequently used for human consumption or for food preparation must of necessity be limited to fugitive and/or non-toxic chemicals, whereas greater latitude in selection exists where the water stream to be treated is in an industrial process or comprises sanitary or industrial wastes, or the like.

Similarly, some treating agents are more effective in controlling molds, while others are more effective in controlling bacteria.

Many instances are known where continued use of the same treating agent, over a prolonged time interval, results in the development of micro-organisms which are resistant to the action of the particular treating agent. Thus, in paper machine white water systems, it is frequently customary to change from one agent to another, as micro-organisms become resistant to the action of the first treating agent. For example, white water treatment on a particular paper machine may involve dosing with a quarternary ammonium compound for a period of several days to several weeks; then, as bacterial slimes start to develop, the treatment is changed to dosing with an agent such as sodium pentachlorphenate. In time, this becomes relatively ineffective, and a further change is required.

With regard to toxic action on micro-organisms, perhaps the most lethal treating agents are elemental chlorine and the organic mercury compounds, such as phenyl mercuric acetate. However, both have serious shortcomings and/or disadvantages when used in some applications. In paper machine operation, elemental chlorine reacts not only with micro-organisms, but also reacts chemically with various furnish components such as starch, cellulose and hemi-celluloses, lignin, dyes and the like. Such chemical interactions rapidly deplete the amount of chlorine in the system, resulting in inadequate control of the micro-organisms, or conversely, requires addition of increased amounts of chlorine, which further magnifies the inteactions with the furnish components. Dyes are particularly susceptible to reaction with chlorine, losing tinctorial strength thereby, and frequently being converted to a different color. This effect can be important even with white papers which utilize only small amounts of tinting dyes.

While the organic mercury compounds are free of major chemical interactions with furnish components, they are retained, at least in part, in the finished paper, and being poisonous, make such paper unsatisfactory for use in direct contact with food products. The organic mercury compounds are expensive, and require careful precautions in handling by mill personnel.

According to the present invention, it has been found that substantially all the objections to prior art treating agents are overcome by combining chlorine with another compounds to form a relatively unstable product which decomposes, releasing the chlorine slowly. The invention resides in a process for combining chlorine with sulfamic acid to form N-mono and/or N,N-dichlorosulfamic acid and/or soluble salts thereof, and includes means for controlled continuous dosing of this product into flowing process streams. It has unexpectedly been found that dosing paper mill white water and stock systems, raw water supplies and sizing and/or coating compositions can be automatically controlled to provide substantially sterile conditions without adverse chemical interactions with other system components.

The chemical reaction between sulfamic acid and chlorine may be represented by the following equations:

(1) $Cl_2 + H_2O \rightarrow Cl^- + ClO^- + 2H+$
(2) $OCl^- + H_2NSO_3^- + H+ \rightarrow HClNSO_3 + H_2O$
(3) $2OCl^- + H_2NSO_3^- + 2H+ \rightarrow Cl_2NSO_3^- + 2H_2O$ According to Equation 1, chlorine gas, dissolved in water, yields the hypochlorite ion, which then reacts with the sulfamate ion. With equal molar ratios of hypochlorite to sulfamate, the reaction according to Equation 2 occurs, producing the N-monochlorosulfamate ion. If a two to one ratio of hypochlorite to sulfamate is used, the reaction proceeds according to Equation 3, yielding N,N-dichlorosulfamate. Soluble alkali and/or alkaline earth metal hypochlorites may be substituted for chlorine, producing the corresponding salts of N-mono and/or N,N-dichlorosulfamic acid.

In use in controlling the growth of micro-organisms in various water streams, the N-chlorosulfamic acids and their soluble salts decompose, relatively slowly, to yield chlorine, nitrogen and sulfuric acid or sulfates, as shown in Equation 4.

(4) $2Cl_2NSO_3^- + 2H_2O \rightarrow 2SO_4^= + 2Cl_2 + N_2 + 4H+$

The N-chlorosulfamic acids have been known for some time, and are described, by Traube and von Drathen, in Ber. 51, page 114 (1918). However, the literature and the art are silent on continuous and/or automatic methods for their preparation and/or use in the control of micro-oganisms.

According to the present invention, chlorine, in the form of chlorine water or as a solution of alkali or alkaline earth metal hypochlorite, is admixed with a solution of sulfamic acid in a reaction vessel, both reactants being supplied in continuous streams, and the product, an aqueous solution of N-mono and/or N,N-dichlorosulfamic acid or alkali or alkaline earth N-mono and/or N,N-dichlorosulfamate, is withdrawn continuously, and supplied to various process streams requiring micro-organism control. For added flexibility of operation, a surge tank suitably may be used between the reaction vessel and the process stream to be treated. If a surge tank is used, the flow of the N-chlorosulfamate solution may be continuous through a closed loop from the surge tank and return, with taps into the loop located to deliver the solution to various process streams requiring micro-organism control. Flow of solution to the various process streams may be controlled by use of automatic chlorine analyzers which operate valves to regulate the flow of solution at rates which will maintain desired residual chlorine contents in the process streams.

Accordingly, it is a principal object of this invention to provide a process for combining chlorine with sulfamic acid or a soluble sulfamate. Another object is to provide for automatically regulating the addition of the resultant product to process streams to control growth of micro-organisms therein. Still another object will become apparent from the description which follows and the appended drawing wherein:

The single figure is a flow diagram of one embodiment of the process of the present invention.

Referring now to the figure, 10 indicates a pipe supplying sulfamic acid solution, which solution passes through check valve 11 and constant pressure regulating valve 12. The flow then continues through an orifice in the pipe as indicated at 13 and passes next to a junction with pipe 14 which supplies dilution water through check valve 15 and constant pressure regulating valve 16, the water stream passing through orifice 17 prior to the admixing of the water with the sulfamic acid solution where the two pipes join at 18. The sulfamic acid solution delivered by pipe 10 is suitably at a concentration of 1 pound per gallon and the constant pressure valve 12 and orifice 13 are adjusted to provide the desired flow which is suitably 0.45 gallon per minute. This flow rate may be obtained by a pressure on the downstream side of valve 12 of 30 p.s.i. gauge with an orifice size of 5/64" diameter. The pressure in the dilution water line downstream from constant pressure valve 16 is suitably 30 pounds p.s.i. gauge and orifice 17 has a diameter of 13/64" which will provide a water flow rate of 3.15 gallons per minute. Thus, under these conditions, the diluted sulfamic acid solution in pipe 19 has a concentration of 0.125 pound per gallon at a flow rate of 3.60 gallons per minute.

An air-operated regulating valve is provided at 20 which permits the sulfamic acid solution to flow into reactor vessel 21, which is provided with a bottom outlet 22 and circulating pump 23. Reactor vessel 21 is also provided with an outlet as shown at 24 which is provided with an atmospheric vent 25 and an electrode chamber 26.

At 27 is provided a supply pipe carrying hypochlorite solution which has a branch pipe drawing from it as indicated at 28, the solution in pipe 28 passing through the air-operated regulating valve 29 and entering reaction vessel 21 at 30. The flow of hypochlorite solution in pipe 28 may suitably be at a rate of 1.5 gallons per minute at a concentration, for example, 0.293 pound per gallon of active chlorine. The hypochlorite solution and the sulfamic acid solution are mixed and reacted in the reaction vessel 21 with its recirculating system 22, 23, and the reaction product solution ultimately leaves through outlet 24 where the oxidation potential of the solution is monitored by the electrode assembly indicated at 26. From this point, the reaction product solution is delivered to intermediate storage tank 31 by pipe 32.

A liquid level gauge 33 is incorporated in the intermediate storage tank 31 and is connected with liquid level controller 34 which has a set-point to open air-operated regulating valve 20 when the level in tank 31 falls below a predetermined point. Likewise, the electrical signal measured by the electrodes at 26 is fed to an oxidation-reduction potential meter and controller as indicated at 35 which is preset to open air-operated regulating valve 29 when the oxidation potential falls below the desired value. It has been found that the preferred oxidation potential of the reaction product flowing past electrode assembly 26 is 620 millivolts. The oxidation-reduction potential controller 35 is thus set to open valve 29 when this potential falls below 620 millivolts and to close valve 29 when the potential exceeds this value. Thus, the flow rate of hypochlorite solution is adjusted to provide the desired ratio of reactants in reaction vessel 21 to insure a uniform product of the desired composition being delivered to intermediate storage tank 31.

The product solution contained in intermediate storage tank 31 is circulated through a pipe loop as indicated at 36 by means of pump 37 whereby the mixture is made accessible to various points in the plant where dosing of product streams for micro-biological growth control is desired, finally returning surplus circulating material to tank 31 as indicated by 38 and 39. Valve 36A is provided to permit periodic cleaning of intermediate storage tank 31.

Branch pipes coming off of pipe 38 are arranged to provide dosing of the chemical solution to various process points requiring it, as indicated at 40, 41, 42, 43, 44, 45 and 46. Dosing of the product streams through these branch pipes may be accomplished manually as indicated at taps 40 and 41 with attendant valves 47 and 48, or such dosing may be automatically controlled as indicated in the case of taps 42 through 46. For automatic control of dosage, air-operated regulating valves are provided at 49, 50, 51, 52 and 53 which are controlled by chlorine analyzers 54, 55, 56, 57 and 58. The chlorine analyzers are fed a sample stream drawn from the main product stream as indicated at 59, 60, 61, 62 and 63, the return sample stream being delivered back to the corresponding product stream, as indicated at 66, 67, 68, 69 and 70, or it may be discarded.

Looking now at the branch pipe indicated by 42 with its attendant regulating valve 49, chlorine analyzer 54 and sample stream 59, the analyzer may be preset to adjust the opening of valve 49 to maintain a desired residual active chlorine concentration in the process stream. Suitably this may range from about .2 part per million to 5 parts per million of active chlorine.

In the event that consumption of the treating agent solution falls below the rate at which the treating agent solution is being prepared in the earlier described portion of the system, the liquid level in intermediate storage tank 31 will rise until liquid level controller 33 operates to close valve 20, and thereupon, the increased oxidation potential indicated by the electrodes 26 will act through controller 35 to shut valve 29.

Thus the system will accommodate to variable consumption rates and will respond satisfactorily with demand from only one or two points or a multiple number of points of use of the material, as the case may be.

As a safety measure, a temperature sensing element may be provided at 64 in conjunction with intermediate storage tank 31 to sound an alarm through recorder 65 in the event that temperature of the solution in tank 31 reaches a predetermined value. This is desirable to avoid spontaneous decomposition of the reaction product which can occur at temperatures of the order of 150° F. or higher.

The N-monochlorinated and N,N-dichlorinated sulfamates are obtained preferably by reacting an aqueous solution of one mole-equivalent of sulfamic acid or an alkali metal or an alkali earth metal sulfamate with an aqueous solution of more than 1.5 moles and up to 2 moles of hypochlorite. The reaction proceeds very rapidly by merely mixing the chemicals at room temperature, and apparently occurs in two steps. The first step results in the the formation of the N-monochlorosulfamate in quantitative yield by the reaction of equimolar amounts of the sulfamate and the hypochlorite ion. The second step results in the conversion of part of the N-monochlorosulfamate obtained in the first step to N,N-dichlorosulfamate. This reaction is probably reversible since, at this stage, the stability of the N,N-dichlorosulfamate is such that, as its relative concentration increases, its tendency to hydrolysis increases similarly. If 0.51 mole additional amount of hypochlorous acid is available for reaction with each mole equivalent of N-monochlorosulfamate formed in the first step, the hypochlorite ion is quantitatively converted to N,N-dichlorosulfamate, and there is obtained a mixture of 0.51 mole equivalents of N,N-dichlorosulfamate and 0.49 mole equivalents of N-monochlorosulfamate. However, if 1.0 mole of hypochlorite ion is available for reaction with each mole-equivalent of N-monochlorosulfamate formed in the first step, the conversion to the dichlorosulfamate is not quantitative. There is obtained a mixture of approximately 0.90 mole-equivalent of N,N-dichlorosulfamate and 0.10 mole-equivalent of N-monochlorosulfamate. Thus, the use of more than 2 moles of hypochlorite ion per mole-equivalent of sulfamate does not result in complete suppression of N-monochlorosulfamate formation. Any excess of hypochlorite ion is comparatively unstable and is destroyed or dissipated in the course of preparation, storing or using the compositions of the present invention. Thus, no advantage is obtained by using more than 2 mole-equivalents of hypochlorite ion per mole-equivalent or sulfamate.

The reaction product of a sulfamate and the hypochlorite ion is relatively unstable, and becomes more unstable as the concentration of the material is increased. Thus, there is a concentration above which undesired rapid hydrolysis of the N-chlorosulfamate occurs, and which is to be avoided. It has been found that this practical limit of concentration lies at about 5%, expressed as available chlorine. A preferred concentration for improved stability and ease of handling is at a concentration of about 3% available chlorine. This solution is stable without measurable decomposition for a period of several days.

Throughout the foregoing, reference has been made to the two different N-chlorosulfamates, the N-monochlorosulfamate, and N,N-dichlorosulfamate. In the description presented herein, the use of the term-N-chlorosulfamate is intended to apply to a reaction mixture which may contain either or both of the foregoing products.

The amount of N-chlorosulfamate required for treatment of a particular product stream will vary greatly with the local conditions. The preferred method is to add a sufficient amount of the N-chlorosulfamate solution to produce a definite small residual amount of active chlorine in the product stream, downstream from the point of initial addition of the material. In a paper machine system, this might well be measured as a residual chlorine content at the point where white water leaves the paper machine system. It has been found that a residual chlorine content of 1 part per million gives very effective control of slime growths which result from micro-organisms, and that a residual of 5 parts per million will produce a system which is substantially sterile. In one series of comparisons, the following data were obtained using microbiological methods to culture process stream samples, and reporting colonies of bacteria per milliliter of the process water.

EXAMPLE 1.—PAPER MACHINE WHITE WATER SYSTEM

| Test No. | Treating Agent | Colonies of Bacteria per ml. | Residual Chlorine, p.p.m.[1] |
| --- | --- | --- | --- |
| 1 | Prior Art [2] | 71,000 | |
| 2 | ___do___ | 220,000 | |
| 3 | ___do___ | 50,000 | |
| 4 | ___do___ | 17,000 | |
| 5 | N-chlorosulfamate | 600 | 1.5 |
| 6 | ___do___ | 100 | 1.7 |
| 7 | ___do___ | 300 | 1.1 |
| 8 | ___do___ | 800 | 1.0 |

[1] Residuals of N-chlorosulfamate may be determined by conventional methods for determining residual active chlorine, e.g. the well-known o-toluidine method.
[2] The prior art slime control agent was a proprietary product which uses disodium cyanodithioimidocarbonate, potassium N-methyldithio carbamate and ethylenediamine as active ingredients.

The above tests were conducted on a paper machine operating with a furnish of 100% chemical pulp, i.e., there was no re-processed waste in the furnish. This furnish normally does not present a major slime control problem.

The following data were obtained on a second paper machine system which utilizes a furnish containing a sizeable proportion of re-processed waste, and has presented a difficult slime control problem.

EXAMPLE 2.—PAPER MACHINE WHITE WATER

| Test No. | Treating Agent | Colonies of Bacteria per ml. | Residual Chlorine, |
| --- | --- | --- | --- |
| 9 | Prior Art [1] | 10,800,000 | |
| 10 | N-chlorosulfamate | 300 | 2.4 |
| 11 | ___do___ | 70,000 | 0.2 |
| 12 | ___do___ | 640,000 | 0.1 |
| 13 | ___do___ | 200 | 2.1 |
| 14 | ___do___ | 0 | 3.2 |
| 15 | ___do___ | 7,000 | 1.7 |
| 16 | ___do___ | 8,000 | 1.6 |
| 17 | ___do___ | 0 | 2.9 |
| 18 | ___do___ | 3 | 2.7 |

[1] Same as in Example 1 (footnote 2).

These tests show excellent control of slime causing micro-organisms where the dosage of N-chlorosulfamate is sufficient to retain a residual active chlorine content of 0.5 to 2 p.p.m. With residual active chlorine at about 3.0 p.p.m., the system is substantially sterile. In this Example 2, the prior art slimicide is wholly inadequate in preventing growth of slime-forming micro-organisms; even though the dosage used was double that recommended by the manufacturer.

In another application of the N-chlorosulfamate solution for control of micro-organisms, as indicated at 40 and/or 41 of FIGURE 1, the material may be effectively added to paper coating compositions which involve the use of starch or casein adhesives in aqueous pigmented systems. Such natural adhesives as starch and casein provide an excellent source of food for the growth of micro-organisms which cause spoilage of the coating composition with attendant development of offensive odors and loss of adhesive properties.

EXAMPLE 3

*Paper coating composition*

Coating composition containing pigment and starch adhesive were prepared in the conventional manner well-known in the art. To one portion of the composition, a conventional preservative was added and to other portions, varying amounts of N-chlorosulfamate were added, ranging from 0.3 to 1.0%, expressed as active chlorine. The various samples were stored for a period up to 48 hours and it was determined that sterile conditions prevailed at the 0.3% level with no detectable spoilage. Residual chlorine was determined on a qualitative basis by adding o-toluidine to the coating mixture. In the presence of a residual chlorine content, the mixture took on a positive yellow color. As a further check, bacterial streak plates were made and incubated for periods of 24, 48 and 72 hours at 37° C., using a culture media. None of the samples containing the N-chlorosulfamate showed any growth of bacteria colonies under any of these conditions, whereas the prior art preservative showed growth of colonies all along the streak on the culture plate. Furthermore, there was no adverse effect on the viscosity or color of the coating composition by the use of the N-chlorosulfamate.

EXAMPLE 4

*Paper coating composition*

A paper coating composition of the conventional type containing dispersed pigment with a casein binder was treated in a manner similar to that described in Example 3, with parallel and comparable results. Again, effective control of micro-organisms was evidenced with no side effects on viscosity or color of the composition.

Since the normal procedures of preparing coating compositions as shown in Examples 3 and 4 is carried out in a batchwise system, it is convenient to add measured quantities of the N-chlorosulfamate solution to the batches by manual operation and automatic control is not necessary. However, in the event that continuous systems for coating preparation were employed, the same type of system as shown in FIGURE 1 at 42 to 46 could well be employed.

Similar experiments have been conducted on the addition of N-chlorosulfamate solutions to sanitary sewage plant effluents, industrial waste, and raw water supplies. In each case, effective control of the growth of micro-organisms was obtained with little or no complication from side effects and at very economical costs.

While the exact mechanism by which the N-chlorosulfamate solution of this invention is able to control microorganism growth is not known, it is quite possible that the active chlorine, tied up in the N-chlorosulfamate molecule, is released by hydrolysis of the N-chlorosulfamate at low enough rate so that it can exhibit a preferential killing action on bacteria and/or molds, and little or no action on other organic matter present in the process stream. At any rate, observed effects with organic products highly susceptible to attack by chlorine have shown substantial freedom from these effects when using the N-chlorosulfamate of this invention.

While the foregoing has presented preferred methods and apparatus for practicing this invention, it is not intended that the invention should be limited thereto, but embraces all modifications and equivalents which come within the scope of the appended claims.

What is claimed is:

1. A process for controlling the growth of micro-organisms comprising the steps of
    (a) continuously supplying a solution of sulfamic acid,
    (b) continuously mixing and reacting said sulfamic acid solution with a hypochlorite solution in a reactor vessel to form a reaction product solution of N-chlorosulfamic acid,
    (c) delivering said N-chlorosulfamic acid solution to an intermediate storage vessel,
    (d) continuously supplying said N-chlorosulfamic acid solution from said intermediate storage vessel to aqueous process streams requiring control of the growth of micro-organisms,
    (e) regulating the rate of supply of sulfamic acid solution by liquid level in said intermediate storage vessel,
    (f) regulating the rate of supply of said hypochlorite solution by the oxidation potential of the N-chlorosulfamic acid solution leaving said reaction vessel, and
    (g) regulating the rate of supply of said N-chlorosulfamic acid solution to said aqueous process stream to maintain a residual active chlorine content of from 0.1 to 5 parts per million, measured downstream from the point of introduction of said N-chlorosulfamic acid.

2. The process of claim 1 wherein said reaction product solution of N-chlorosulfamic acid is formed at a concentration of from 1% to 5%, based on active chlorine content.

3. The process of claim 1 wherein said sulfamic acid solution and said hypochlorite solution are mixed and reacted in a ratio of 1 mole equivalent of sulfamic acid to 2 mole equivalents of hypochlorite.

4. The process of claim 1 wherein the oxidation potential of said N-chlorosulfamic acid solution is of the order of 620 millivolts.

5. The process of claim 1 wherein said reaction product solution of N-chlorosulfamic acid comprises a mixture of N-monochlorosulfamic acid and N,N-dichlorosulfamic acid.

6. The process of claim 1 wherein said aqueous process stream is a paper machine stock and white water system.

7. The process of claim 1 wherein said aqueous process stream is a paper coating composition comprising an adhesive selected from the group of starch and casein.

8. The process of claim 1 wherein said aqueous process stream is a raw water supply system.

9. The process of claim 1 wherein said aqueous process stream is an industrial waste.

10. The process of claim 1 wherein said aqueous process stream is sanitary sewage treatment plant effluent.

11. A process for controlling the growth of micro-organisms comprising the steps of
    (a) continuously mixing and reacting solutions of sulfamate and hypochlorite in a ratio of one mole of sulfamate to two moles of hypochlorite to produce a reaction product solution of N-chlorosulfamate.
    (b) delivering said reaction product solution to an intermediate storage vessel,
    (c) supplying said N-chlorosulfamate solution from said intermediate storage vessel to aqueous process streams in an amount regulated to provide from 0.1 to 5.0 p.p.m. residual active chlorine, and
    (d) regulating the rate of mixing and reacting said sulfamate and said hypochlorite solutions according to the liquid level in said intermediate storage vessel.

12. The process of claim 11 wherein said sulfamate solution comprises sulfamic acid.

13. The process of claim 11 wherein said hypochlorite solution comprises a metal hypochlorite selected from the alkali and alkaline earth metal hypochlorites.

14. The process of claim 11 wherein said aqueous process stream comprises a paper machine stock and white water system.

15. The process of claim 11 wherein said aqueous process stream is a paper coating composition comprising an adhesive selected from the group of starch and casein.

16. The process of claim 11 wherein said aqueous process stream comprises a water cooling tower system.

17. A process for controlling the growth of micro-organisms comprising the steps of
    (a) mixing and reacting solutions of sulfamate and hypochlorite in a ratio of 1 mole equivalent of sulfamate to 1.5 to 2.0 mole equivalents of hypochlorite to produce a reaction product solution comprising N-chlorosulfamate,
    (b) continuously supplying said N-chlorosulfamate solution to aqueous process streams in an amount regulated to suppress growth of micro-organisms and maintain a residual chlorine concentration of from 0.1 to 5.0 parts per million measured downstream from the point at which said N-chlorosulfamate solution is supplied to said process streams, and
    (c) controlling the rate of mixing and reacting said sulfamate and hypochlorite solutions to produce said reaction product solution in the amount required in (b).

18. The process of claim 17 wherein said aqueous process stream comprises a paper machine stock and white water system.

19. The process of claim 17 wherein said aqueous process stream is a paper coating composition comprising an adhesive selected from the group of starch and casein.

20. The process of claim 17 wherein said aqueous process stream comprises a water cooling tower system.

References Cited

UNITED STATES PATENTS

| | | | |
|---|---|---|---|
| 2,427,097 | 9/1947 | Kamlet et al. | 252—187 X |
| 2,438,781 | 3/1948 | Kamlet | 23—86 |
| 2,548,646 | 4/1951 | Bicknell et al. | 106—15 |
| 2,944,967 | 7/1960 | Dunklin et al. | 210—64 |
| 3,066,015 | 11/1962 | Palmqvist | 23—285 |
| 3,082,146 | 3/1963 | Wentworth et al. | 162—161 X |
| 3,091,519 | 5/1963 | Hebner | 23—285 |
| 3,170,883 | 2/1965 | Owen et al. | 252—187 |
| 3,177,140 | 4/1965 | Herschler | 210—64 |

MORRIS O. WOLK, *Primary Examiner.*

M. E. ROGERS, *Assistant Examiner.*